Figure 1:
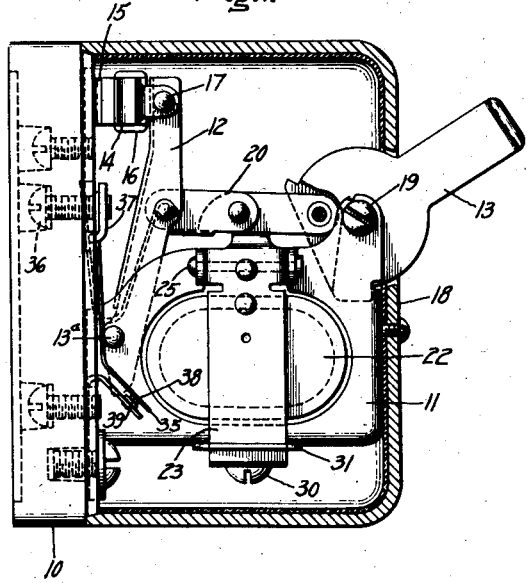

March 1, 1932.  G. R. BROWN  1,847,922

CIRCUIT INTERRUPTER

Filed Aug. 30, 1928

Inventor:
George R. Brown,
by Charles E. Tullar
His Attorney.

Patented Mar. 1, 1932

1,847,922

UNITED STATES PATENT OFFICE

GEORGE R. BROWN, OF BRIDGEPORT, CONNECTICUT, ASSIGNOR TO GENERAL ELECTRIC COMPANY, A CORPORATION OF NEW YORK

CIRCUIT INTERRUPTER

Application filed August 30, 1928. Serial No. 303,073.

The invention relates to electric circuit interrupters and has for its object the provision of an improved form of circuit interrupter that is of minimum size for its capacity and may be operated manually to open and close the energizing circuits of electrical devices such as motors and the like, and at the same time is arranged to provide automatic time element overload protection therefor.

There has long been a demand for a small and inexpensive circuit interrupter capable of providing manual control for circuits of relatively small current carrying capacity and which also will automatically interrupt the circuit in case the current continues at an abnormal value for an appreciable time. Heretofore the ordinary snap or tumbler type switch has been employed to provide manual control of the circuit and fuses have been necessary to obtain the overload protection. However, with household appliances, such as washing machines, ironing machines, and the like, in which the driving motor often may be stalled or overloaded, the frequent necessity for renewal of the overload protective fuses has occasioned considerable difficulty and inconvenience, particularly with persons not familiar with electric circuits or protective and controlling apparatus therefor.

With the improved circuit interrupter of the present invention the blowing and renewal of the fuses is entirely avoided and the circuit interrupter may be readily reset to the circuit closing position after it is operated automatically in response to overload conditions entirely by means of the usual operating handle. Furthermore, a time delay is introduced into the automatic operation of the circuit interrupter in response to overload conditions by means of an electrically heated thermal element. In this way the automatic overload operating mechanism of the interrupter is enabled to remain inactive during the starting period of electric motors when the current is abnormally large and still provide adequate overload protection against the continued flow of the same value of current in the circuit after the motor is started.

In addition, the improved form of circuit interrupter of the present invention is provided with an operating mechanism of the trip free type that effectively prevents intentional holding of the switch contacts in the closed position with the automatic overload tripping mechanism operatively energized. Furthermore, the interrupter embodies improved features of construction and arrangement that enable it to be manufactured at such low cost as to compete commercially with the ordinary tumbler or snap switch and protective fuses protective arrangement.

Figure 2:
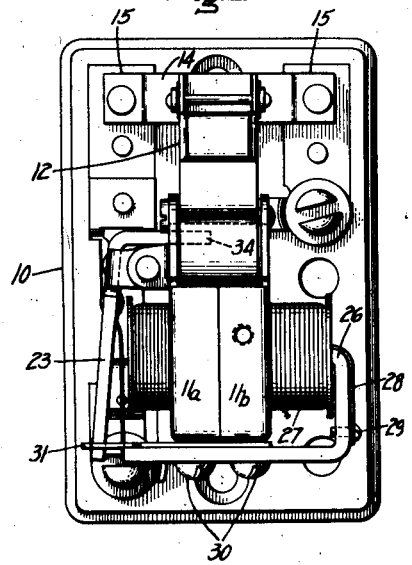
Figure 3:
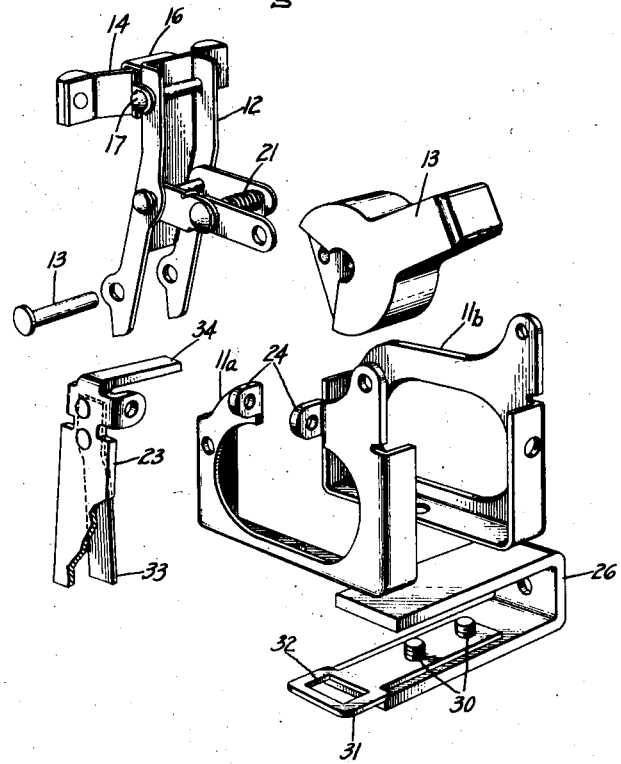
Figure 4:
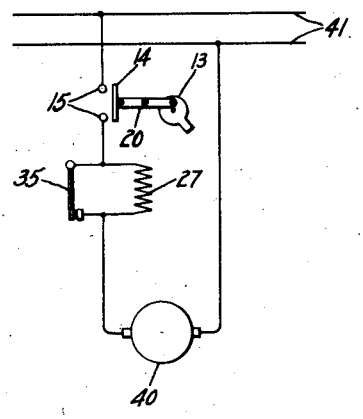

In the accompanying drawings Fig. 1 shows a side view of a preferred form of circuit interrupter embodying the improvements of the present invention with the enclosing cover cut away so as to show the assembled operating mechanism; Fig. 2 is a front view of the interrupter with the cover entirely removed; Fig. 3 is a perspective exploded view of certain parts of the switch operating mechanism; and Fig. 4 is a circuit diagram illustrating schematically the connection arrangement of the interrupter to control a motor circuit.

In Fig. 1 the switch mechanism is shown mounted on the base 10 preferably formed of moulded insulating material, such as bakelite or the like, and comprises the box-like frame 11, which as more clearly shown in Figs. 2 and 3 is formed of two complementary channel shaped parts, 11a and 11b, disposed in abutting relation with the movable switch arm 12 and the operating handle 13 pivotally mounted between the sides thereof and with the central openings 41 and 42 formed in the sides thereof in alinement to receive the operating electromagnets 22 as described hereinafter. The switch arm 12 is of channel shape and is mounted on the pivot pin 13a, which extends through suitable holes provided in the frame elements 11a and 11b and corresponding holes formed in the channel sides of the arm 12. At the upper end of the movable switch arm 12 is pivotally mounted the bridging contact member 14 which cooperates with the two spaced-apart stationary contacts 15 which are mounted directly on the base 10 preferably by screws as indicated in Fig. 1. The bridging contact 14 preferably is formed of yielding material and is carried in a cradle 16 which is loosely mounted on the pin 17 so as to allow relatively free movement of the bridging contact into good conducting alignment with the stationary contacts 15.

The operating handle 13 also preferably is formed of moulded insulating material such as used in making the base 10 and is of such shape that the end of the handle extends through a suitable opening in the switch cover 18 with the base of the handle of cylindrical shape so as to substantially close the opening with the handle in any operating position. The handle is pivotally mounted in parallel spaced relation with the pivoted switch arm 12 on the screw 19 which extends between the upstanding lugs formed on each of the parts 11a, 11b, forming the frame. The operating handle is connected with the switch arm 12 through the toggle link mechanism 20 and the spring 21 is provided for insuring that this toggle mechanism is maintained in its extended position even though subjected to jars and vibration until tripped by the automatic operating mechanism of the switch.

The automatic operation of the switch is effected by the electromagnet 22 which to conserve space is extended transversely through the openings 41 and 42 in the sides of the two frame members 11a and 11b with the L-shaped movable armature member 23 pivotally mounted in the lugs 24 extending from the side of the frame part 11a on the pivot pin 25. The magnet frame 26 of the electromagnet is substantially U-shaped, as more clearly shown in Fig. 3, so as to straddle the bottom portion of the frame and provide two magnetic poles closely adjacent the armature 23. The operating winding 27 is maintained in position on one leg of the U which extends centrally through the openings 41 and 42 by the strap member 28. One end of strap 28 is bent up to engage with the outer end of the magnet windings and the other end of which is bent down and secured to the magnet frame by the screw 29. The lower leg of the V-shaped magnet frame 26 is secured to the underside of the frame 11 by the two screws 30, which also serve to hold the armature stop 31 in place.

It will be observed that the armature stop 31 is provided with a hole 32 within which the end of the armature is free to move. The armature carries a spring 33, preferably riveted thereto, as indicated in Fig. 3, which engages with one side of the hole 32 so as to bias the armature into engagement with the other side of the hole, as clearly indicated in Fig. 2. This serves to normally hold the bent over tripping finger 34 of the armature out of engagement with the toggle mechanism 20 and the arrangement is such that when the armature is attracted towards the two adjacent poles of the U-shaped magnet frame of the electromagnet the tripping finger engages with the toggle mechanism 20 so as to collapse the latter and thereby permit the switch arm 12 to be operated to the circuit opening position.

The time delay introduced into the operation of the armature 23 upon the occurrence of overload conditions is obtained by means of the thermostatic switch member 35 which is securely mounted at one end in engagement with one of the stationary contacts 15 by means of the screw 36 and the clamping member 37 and carries a movable contact 38 at its free end. The contact 38 moves into and out of engagement with the stationary contact 39 depending upon whether the thermostat 35 is cool or hot.

As shown more clearly in Fig. 4, the thermostat 35 is connected in the circuit controlled by the switch in shunt relation with the magnetizing winding 27 of the electromagnet. Thus due to the relatively low resistance of the thermal element, the electromagnet is short circuited and thereby rendered ineffective since very little current flows through the operating winding of the electromagnet as long as the contacts of the thermal element are closed. However, when the thermostat is heated as by the continued flow of an abnormal value of current, it separates its contacts and thereby causes all the current in the circuit to flow through the winding of the electromagnet. As the time required to heat the thermal element 35 sufficiently to open its contact varies approximately inversely with the square of the value of current flowing therethrough, it will be evident that a corresponding time delay is introduced into the operation of the armature 23 by the electromagnet.

Thus, with the switch constructed in the manner just described and connected to control the circuit through which the motor 40 is energized from the supply lines 41, as indicated in Fig. 4, it will be apparent that the motor circuit may be opened and closed at will by manual operation of the handle 13. During this operation the toggle mechanism 20 remains in its extended position with the links in alignment and the movement of the switch arm 12 is effected entirely by the rotation of the operating handle about its pivot 19. When the switch is closed the motor 40 may draw an abnormally large current from the supply lines during the starting period. Due, however, to the necessary time interval required for this current to raise the temperature of the thermal element 35, the switch will remain in the closed position. After the motor is once started the current soon decreases to the normal operating value and the heating of the thermal element 35 is correspondingly decreased. If, however, at any time during operation, the motor 40 should become stalled or overloaded by imposing an excessive load thereon, the increased current in the circuit is effective to heat the thermal element 35. If the overload continues sufficiently long for the thermal element 35 to open its contacts, all the current in the circuit flows through the operating winding 27. Thereupon the armature 23 is attracted and moves the tripping finger 34 to break the alignment of the toggle links 20 and thereby permit the switch arm 12 to open the circuit.

In order to reclose the switch it is only necessary to operate the handle 13 to the open position whereupon the toggle links 20 again are brought into alignment and permit the switch arm 12 to be closed upon operation of the handle 13 to the closed position, as shown in Fig. 1. If the overload conditions persist the electromagnet again operates the armature to trip the toggle as it will be observed that it is impossible to manually hold the switch arm in the circuit closing position under these conditions.

While I have illustrated and described a switch mechanism embodying the present invention in the preferred form, it will be understood that various changes and modifications may be made therein without departing from the spirit and scope of my invention and I intend to cover such changes and modifications by the following claims.

What I claim as new and desire to secure by Letters Patent of the United States, is:

1. In an electric switch, the combination of a two-part frame provided with openings in the sides thereof in alinement, a switch member pivoted between the sides of the frame, an operating handle therefor pivoted between the sides of the frame, a toggle mechanism interconnecting the switch mechanism and the operating handle, and an operating electromagnet extending transversely of the frame through said openings in the sides thereof and having a movable armature pivotally mounted on one side of the frame and provided with a tripping finger disposed in position to trip said toggle upon attraction of the armature.

2. In an electric switch, the combination of a frame formed of a pair of complementary channel-shaped members mounted in abutting relation and provided with openings in the sides thereof in alinement, a switch member pivotally mounted between the sides of said frame, an operating handle therefor pivotally mounted between the sides of said frame, a toggle link mechanism operatively interconnecting said switch member and said operating handle, an operating electromagnet extending transversely of the frame through said openings in the sides thereof and having a U-shaped magnetic structure straddling a portion of said frame, and an armature pivotally mounted on one side of said frame in attractive relation with the poles of said U-shaped magnetic structure and provided with a tripping finger disposed in position to trip said toggle upon attraction of said armature.

3. In an electric switch, the combination of a base, a two-part frame mounted thereon with the sides of the frame in spaced apart relation, each side of said frame having a central opening therein, a switch arm pivotally mounted at one end between the sides of said frame adjacent the said base and having a bridging contact at the free end thereof, spaced apart stationary contacts mounted on said base in circuit controlling relation with said bridging contact, an operating handle pivotally mounted between the sides of said frame remote from said base, a toggle link mechanism operatively interconnecting said switch arm and said operating handle, an electromagnet having a U-shaped magnetic structure with one leg thereof disposed transversely through said openings in the sides of said frame, an armature pivotally mounted at one side of said frame in attractive relation with the poles of said magnetic structure and having a bent over finger extending into position to trip said toggle mechanism upon attraction of the armature.

In witness whereof, I have hereunto set my hand this 28th day of August, 1928.

GEORGE R. BROWN.